W. Mosher.
Revolving Rake.
N° 54582          Patented May 8, 1866.
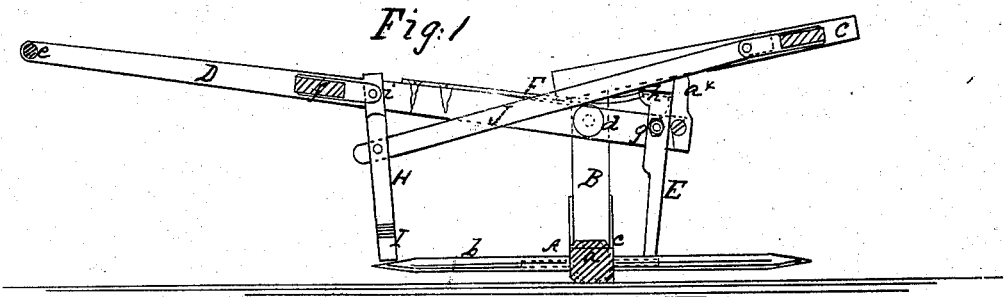
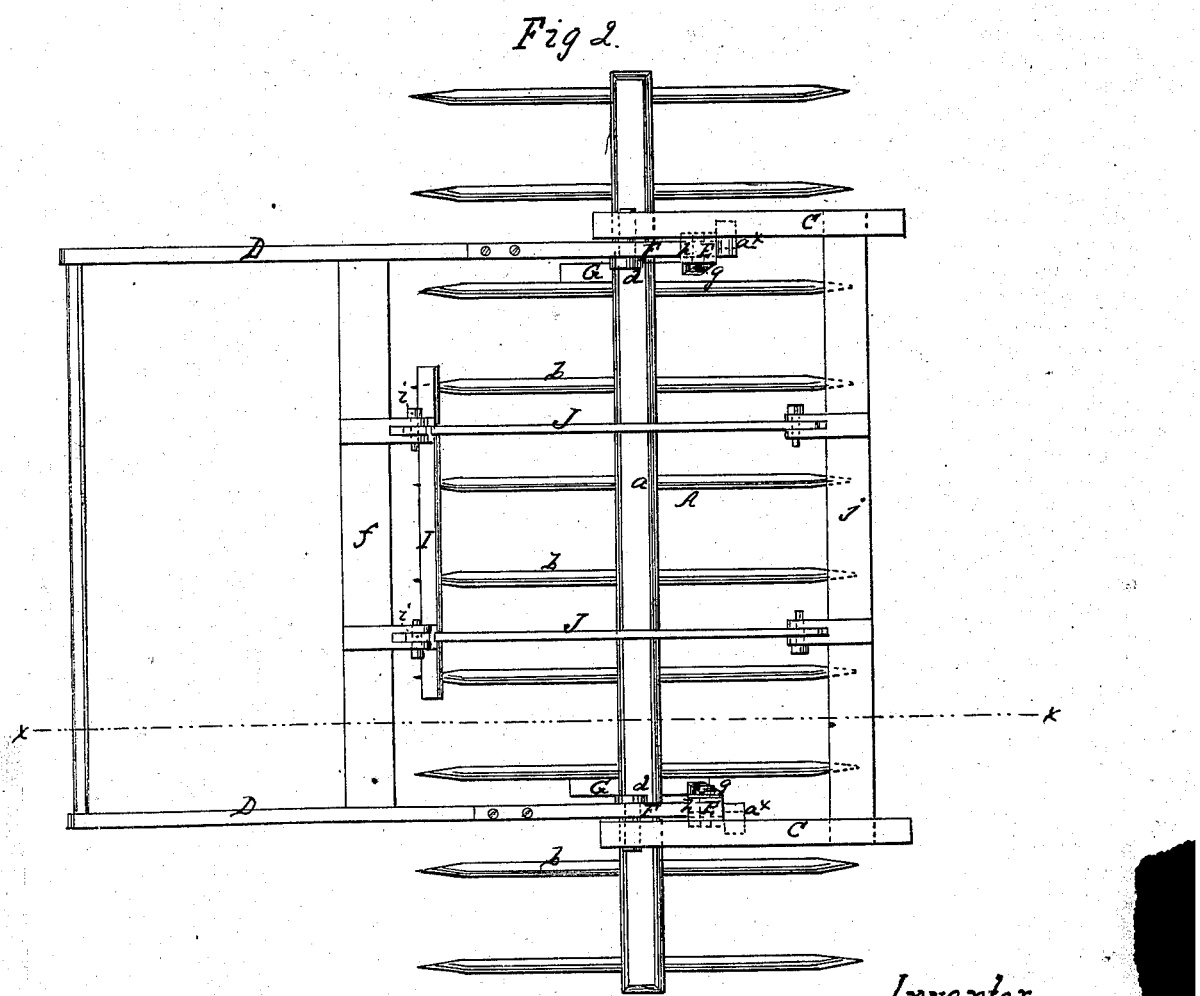
Witnesses                                   Inventor.
                                    Washington Mosher
                                       Munn & Co
                                         Attorneys

UNITED STATES PATENT OFFICE.

WASHINGTON MOSHER, OF PITTSTOWN, NEW YORK.

IMPROVEMENT IN HORSE-RAKES.

Specification forming part of Letters Patent No. 54,582, dated May 8, 1866.

*To all whom it may concern:*

Be it known that I, WASHINGTON MOSHER, of Pittstown, in the county of Rensselaer and State of New York, have invented a new and Improved Horse-Rake; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate corresponding parts.

The invention relates to a new and improved arrangement of the handles of the rake and the mechanism connected therewith for holding the rake to its work and liberating it, so that it may turn and discharge its load.

The object of the invention is to facilitate the manipulation of the parts in operating the rake, and also to render the latter more durable than usual, the handles in the present arrangement being subjected to a great strain every time the rake turns to discharge its load.

A represents the rake, composed of a head, $a$, with teeth $b$ passing transversely through it. These parts may be constructed in the same way as the ordinary wooden-toothed rakes.

B B are standards, to the lower ends of which the rake-head $a$ is attached by metal straps $c\ c$, the thills C C being secured to the upper ends of the standards B B.

D D are handles, connected by pins $d\ d$ to the standards B B, and having their outer ends connected by a bar, $e$, and also connected near the center of their length by a bar, $f$. The handles D D project a short distance in front of the standards B B, and have a metal bar, E, attached by a pivot, $g$. The upper ends of these bars E are formed with heads or lips $h$, extending backward, and springs F, which are attached to the upper surfaces of these handles, bear against the under sides of the heads or lips $h$, said springs having a tendency to keep the upper parts of the bars E above the pivots $g$ in contact with upright projections $a^x$ at the front ends of the handles D, said projections serving as stops for the bars E.

G G represent bars which pass transversely through the head $a$, and upon which the lower ends of the bars E E rest or bear, the latter keeping the rake to its work, and H H are two pendants, which are connected by joints $i$ to the cross-bar $f$ of the handles, the lower ends of the pendants being connected by a bar, I, which, when the device is at work, bears upon the rear parts of four of the rake-teeth and prevents the rake from casually turning.

The pendants H H are connected by bars J J to the cross-bar $j$ of the thills C C, a pivot or joint connection being used at each end of said bars.

From the above description it will be seen that as the device is drawn along the operator, in order to allow the rake to turn and make a half-revolution to discharge its load, draws back the handles D D so that the bar I at the lower ends of the pendants H H will pass off from the rake-teeth, and by inclining the rake so that the front ends of its teeth will come in contact with and catch against the earth the rake will make a half-revolution and discharge its load, the bars E being forced forward when the rear bars, G, come in contact with them, and the bars E passing over and bearing upon G when the latter pass below the former. Thus by this simple arrangement neither the handles nor any of their concomitant parts will be subjected to any strain, and the handles and parts connected therewith may be readily detached from the machine when the latter is not required for use, so that it may be stowed away in compact form.

Having thus described my invention, I claim as new and desire to secure by Letters Patent—

The bars E E, pivoted to the front ends of the handles D D, in combination with the springs F and the bars G G in the rake-head, substantially as and for the purpose set forth.

WASHINGTON MOSHER.

Witnesses:
PETER P. RAY,
JACOB R. FAULKNER.